UNITED STATES PATENT OFFICE.

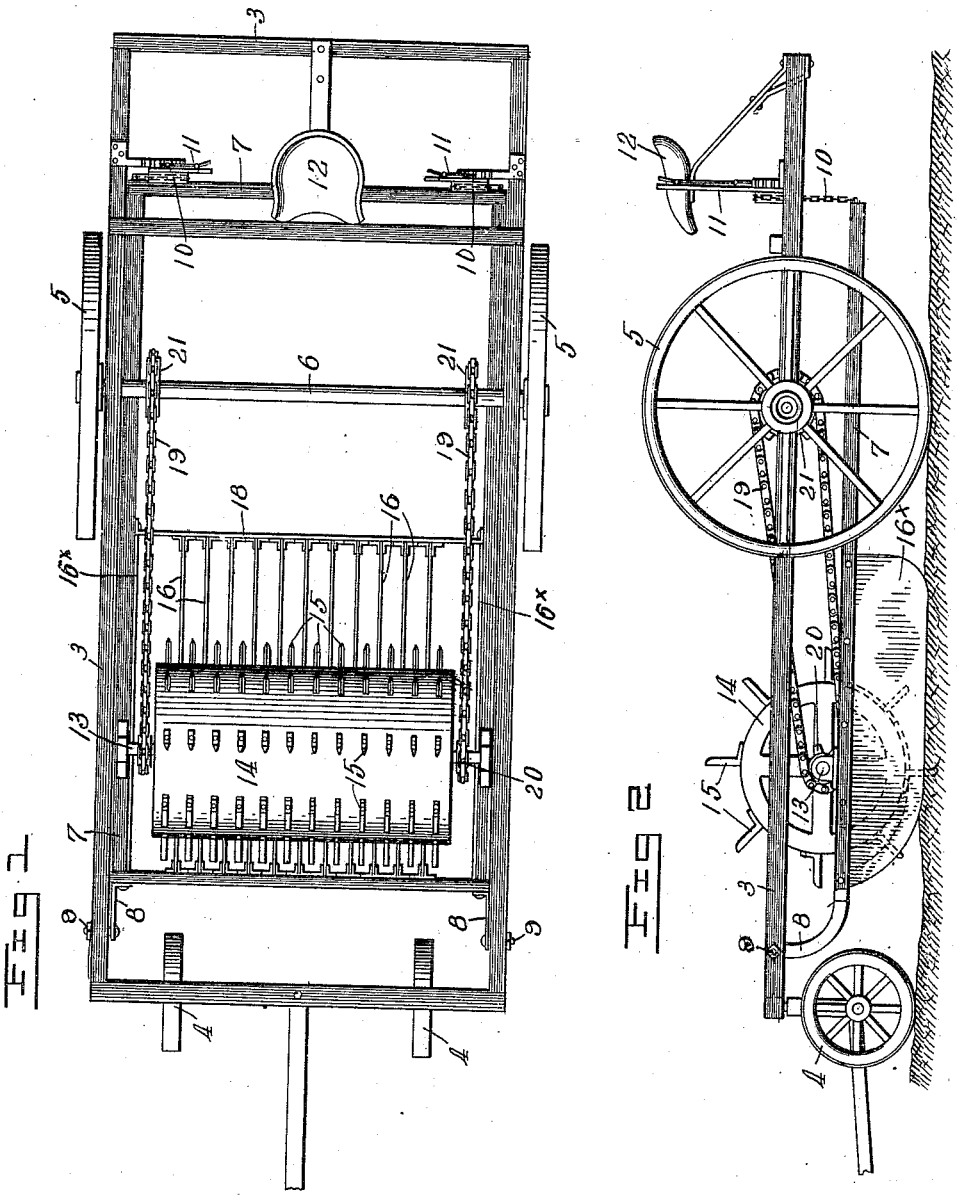

MICHAEL W. WALLACE, OF MOLINE, ILLINOIS.

STALK-CUTTER AND HARROW.

973,395.     Specification of Letters Patent.     Patented Oct. 18, 1910.

Application filed October 1, 1909. Serial No. 520,441.

*To all whom it may concern:*

Be it known that I, MICHAEL W. WALLACE, a citizen of the United States, and resident of the city of Moline, Rock Island county, Illinois, have invented certain new and useful Improvements in Stalk-Cutters and Harrows; and I do hereby declare the following to be a full, clear, and exact description of the invention, such as will enable others skilled in the art to which it appertains to make and use the same.

This invention relates to an improved stalk cutter and harrow, and one of the objects of the invention is to provide a machine by which corn or other stubble may be cut into small pieces preparatory to plowing the ground, and that will also mutilate the roots of the stalks, weeds and other vegetation and put the ground in better condition for plowing.

The invention also aims to provide a machine of the above mentioned kind that can be used as a rotary harrow or pulverizer for preparing all kinds of plowed ground for seeding.

The invention consists in the novel features and combinations of parts to be hereinafter described and pointed out in the claims.

In the accompanying drawing, Figure 1 is a top plan view of the machine, and Fig. 2 is a side elevation of the same.

In the embodiment illustrated, the machine is provided with a substantially rectangular main frame 3 that is supported at the front on small ground wheels 4 and at the rear by ordinary wheels 5 that are connected by an axle 6. The machine is drawn over the ground by a suitable draft connection at the front, adjacent the ground wheels. Within the main frame 3 there is positioned a rectangular frame 7, that is located below the main frame and substantially parallel therewith and pivoted to said main frame at a point adjacent the front of the latter, the pivotal connection being effected by means of hangers 8 that are applied to the front bar of the inside movable frame and bolted to the side members of the main frame by means of bolts 9. At the rear of the frame 7 the same is held up in substantial parallelism with the main frame by means of chains 10 that may be raised or lowered to a slight extent by levers 11, one of which is located at each side of the machine, said levers being located at opposite sides of a seat 12 for the driver.

The movable frame 7 has journaled therein at its front portion a cross shaft 13 on which is mounted a drum or cylinder 14 provided with cutting knives 15 that project radially from the surface of said cylinder or drum. These knives 15 are arranged in longitudinal rows, and between each pair of the knives there extends a horizontal ground knife 16 that is rigidly carried by the movable frame 7.

Each of the knives on the cylinder is fastened to the latter by any suitable means, and extends out from the face of the cylinder with the sharp edge of the knife in front. The ground knives, which are sharpened at their lower edges to cut the soil simultaneously with the cylinder knives, are bolted to the lower frame 7 and the connection at the rear ends of these knives is effected by means of a cross bar 18 extending between the side bars of the lower frame, as shown in Fig. 1. At the sides of the gang of ground knives, the side bars of the frame 7 carry depending fenders $16^x$.

The cylinder or drum 14 is driven by means of sprocket chains 19 that extend between sprockets 20 on the shaft 13 of the cylinder and sprockets 21 on the main shaft or axle 6. The sprockets 21 are preferably made larger than those on the cylinder shaft so that the cylinder will be rotated at the speed which I have found to be necessary.

In the operation of the machine the ground knives 16 will be drawn over the soil and will preferably cut the soil to a depth of from two to four inches. At the same time the cylinder will be rotated and this will cause the cylinder knives to cut into the ground at points between the ground knives. The cylinder knives are preferably so arranged as to cut into the ground more deeply than the ground knives.

When the machine is operated in the manner described, it acts very effectively to cut up corn or other stubble preparatory to plowing and it also cuts the roots of whatever vegetation there is so that the soil will be in better condition for the plow.

It is obvious that the machine is also well adapted for use as a rotary harrow or pulverizer as the action of the knives is such as to break up the clods thoroughly and prepare the soil for seeding.

What I claim is:—

1. In a stalk cutter and harrow, the combination of a frame, a cylinder or drum journaled transversely therein, radially extending knives carried by the cylinder and sharpened along their front edges, and a plurality of horizontal forwardly and rearwardly extending ground knives carried by the frame and extending beneath the cylinder and between the cylinder knives, said cylinder knives being arranged to cut into the soil more deeply than the ground knives.

2. In a stalk cutter and harrow, a frame, a cylinder or drum journaled transversely therein and carrying a plurality of knives, and a plurality of rigid ground knives carried by the frame and disposed beneath the cylinder and between the cylinder knives, said ground knives being sharpened at their lower edges and arranged to cut into the soil to a less extent than the cylinder knives.

In testimony whereof I affix my signature, in presence of two witnesses.

MICHAEL W. WALLACE.

Witnesses:
 LYDIA A. PARKER,
 JOHN J. INGRAM.